United States Patent
Broderick et al.

(10) Patent No.: US 6,801,356 B2
(45) Date of Patent: Oct. 5, 2004

(54) OPTICAL PARAMETRIC DEVICES AND METHODS FOR MAKING SAME

(75) Inventors: Neil Broderick, Southampton (GB); Valerio Pruneri, Milan (IT); David Richardson, Southampton (GB); Tanya Monro, Southampton (GB)

(73) Assignee: University of Southampton, Hampshire (GB)

(*) Notice: Subject to any disclaimer, the term of this patent is extended or adjusted under 35 U.S.C. 154(b) by 213 days.

(21) Appl. No.: 09/986,363

(22) Filed: Nov. 8, 2001

(65) Prior Publication Data

US 2002/0126370 A1 Sep. 12, 2002

Related U.S. Application Data

(60) Provisional application No. 60/248,093, filed on Nov. 14, 2000.

(30) Foreign Application Priority Data

Nov. 9, 2000 (EP) .............................................. 00309948

(51) Int. Cl.⁷ .......................... G02F 1/365; G02F 1/383

(52) U.S. Cl. ........................ 359/332; 359/326; 359/328

(58) Field of Search ................................ 359/326–332; 385/122

(56) References Cited

U.S. PATENT DOCUMENTS

| 6,097,870 A | 8/2000 | Ranka et al. ................ 385/127 |
| 2002/0076155 A1 * | 6/2002 | Choi et al. ..................... 385/37 |

FOREIGN PATENT DOCUMENTS

| EP | 810 453 | 3/1997 |
| EP | 918 244 | 5/1999 |
| WO | WO 01/06304 | 1/2001 |
| WO | WO 01/06313 | 1/2001 |

OTHER PUBLICATIONS

Faccio et al, "First Demonstration Of Thermal Poling In Holey Fibres", 2001 Conference On Lasers And ElectroOptics (CLEO '01), paper JTuB7, pp. 592–593, May 2001.*

Faccio et al, "First Demonstration Of Thermal Poling In Holey Fibres", 2001 Quantum Electronics And Laser Science Conference (QELS '01), paper JTuB7, pp. 78–79, May 2001.*

(List continued on next page.)

Primary Examiner—John D. Lee
(74) Attorney, Agent, or Firm—Finnegan, Henderson, Farabow, Garrett & Dunner, L.L.P.

(57) ABSTRACT

An optical parametric device for broadband parametric processes involving first and second frequencies $\omega_1$ and $\omega_2$. The device comprises an optical fiber comprising a core and a cladding, the cladding being microstructured with holes for providing waveguiding confinement of at least one optical mode in the core. The optical fiber is poled lengthwise with a non-linearity profile having a period that satisfies a quasi phase matching (QPM) condition including the first and second frequencies. Through the use of a poled holey fiber of suitable hole structure, it is possible to increase the second harmonic (SH) efficiency in comparison with poled conventional (non-holey) fiber. This is achieved by a combination of a low mode overlap area between the fundamental and SH waves, a low absolute value of the mode area, and a large SH bandwidth per unit length of the fiber, all of which can be provided together in a poled holey fiber.

19 Claims, 6 Drawing Sheets

OTHER PUBLICATIONS

Monro et al, "Broad–Band Second–Harmonic Generation In Holey Optical Fibers", IEEE Photonics Technology Letters, vol. 13, No. 9, pp. 981–983, Sep. 2001.*

Monro et al, "Holey Fibres For Efficient Broadband Second Harmonic Generation", Proceedings Of $27_{th}$ European Conference On Optical Communications (ECOC '01), Amsterdam, paper Th.A.2.5, pp. 590–591, 2001.*

Armstrong, J. A. et al., "Interactions between Light Waves in a Nonlinear Dielectric", Physical Review, vol. 127, No. 6, pp. 1918–1938, (1962), Sep.

Yamada, M. et al., "First–order quasi–phase matched $LiNbO_3$ waveguide periodically poled by applying an external field for efficient blue second–harmonic generation", Appl. Phys. Lett., 62, No. 5, pp. 435–436, (1993), Feb.

P. Baldi, et al., "Efficient Quasiphase–Matched Generation of Parametric Fluorescence in Room Temperature Lithium Niobate Waveguides", Electronics Letters, vol. 29, pp. 1539–1540, (1993), Aug.

Pruneri, V. et al., "Greater than 20%–efficient frequency doubling of 1532–nm nanosecond pulses in quasi–phase–matched germanosilicate optical fibers", Optics Letters, vol. 24, No. 4, pp. 208–210, (1999), Feb.

Chou, M. H. et al., "Efficient Wide–Band and Tunable Midspan Spectral Inverter Using Cascaded Nonlinearities in $LiNbO_3$ Waveguides", IEEE Photonics Technology Letters, vol. 12, No. 1, pp. 82–84, (2000), Jan.

Nazarathy, M. et al., "Spread–spectrum nonlinear–optical interactions: quasi–phase matching with pseudorandom polarity reversals", Optics Letters, vol. 12, No. 10, pp. 823–825, (1987), Oct.

Chou, M. H., et al., "1.5–$\mu$m–band wavelength conversion based on difference–frequency generation in $LiNbO_3$ waveguides with integrated coupling structures", Optics Letters, vol. 23, No. 13, pp. 1004–1006, (1998), Jul.

Birks, T. A., et al., "Endlessly single–mode photonic crystal fiber", Optics Letters, vol. 22, No. 13, pp. 961–963, (1997), Jul.

Ranka, J. K. et al., "Optical properties of high–delta air–silica microstructure optical fibers", Optics Letters, vol. 25, No. 11, pp. 796–798, (2000), Jun.

Monro, T. M., et al., "Holey Optical Fibers: An Efficient Modal Model", Journal of Lightwave Technology, vol. 17, No. 6, pp. 1093–1102, (1999), Jun.

Bonfrate, G. et al., "Parametric fluorescence in periodically poled silica fibers", Applied Physics Letters, vol. 75, No. 16, pp. 2356–2358, (1999), Oct.

Pruneri, V. et al., "Efficient frequency doubling of 1.5 $\mu$m femtosecond laser pulses in quasi–phase–matched optical fibers", Applied Physics Letters, vol. 72, No. 9, pp. 1007–1009, (1998), Mar.

Richardson, D. J., "Emerging fiber components for lightwave communications", CLEO '99, p. 329, (1999).

Bonfrate, G. et al., "Periodic UV erasure of the nonlinearity for quasi–phase–matching in optical fibers", CLEO 2000, p. 73, (2000).

Birks, T. A., et al., "Full 2–D photonic bandgaps in silica/air structure", Electronics Letters, vol. 31, No. 22, pp. 1941–1943, (1995), Oct.

* cited by examiner

OPTICAL PARAMETRIC DEVICES AND METHODS FOR MAKING SAME

This application claims benefit of Ser. No. 60/248,093 filed Nov. 14, 2000.

BACKGROUND OF THE INVENTION

The invention relates to optical devices based on parametric processes in non-linear waveguides.

In a non-linear process involving multiple interacting fields of different frequencies, the phase velocities at the different frequencies will usually differ. As a result there will be no significant net energy transfer between the different interacting fields unless measures are taken to provide overall phase matching. Phase matching requires that the relative phase mismatch between the interacting fields is zero over the length of the optical path. Phase matching can be achieved in several ways, of which so-called quasi phase matching (QPM) is one widely used technique [1].

QPM is based on the idea of providing a periodic modulation of the non-linear susceptibility $\chi$ along the optical path of a non-linear material, with the periodic modulation having a period $\alpha$ matched to the length over which two interacting fields develop a relative phase mismatch of half a period, $\pi$. In fact, QPM does not address the phase mismatch locally, but provides overall compensation between regions of differing non-linearity, so that efficient net energy transfer from a pumping wave to a signal wave can take place.

For a second order non-linear (SON) parametric down conversion (PDC) process of the kind $\omega_p = \omega_s + \omega_i$ where $\omega_p$, $\omega_s$ and $\omega_i$ are the pump, signal and idler frequencies, respectively, the phase matching (PM) condition can be expressed as:

$$\Delta\beta = \beta(\omega_p) - \beta(\omega_s) - \beta(\omega_i) = 0$$

where $\beta(\omega_p)$ $\beta(\omega_s)$ and $\beta(\omega_i)$ are the propagation constants of the pump, signal and idler waves, respectively.

Other expressions hold for different non-linear processes, such as third harmonic generation, four-wave mixing etc. For example, for second harmonic generation (SHG) in which a pump beam is used to generate a frequency-doubled signal, the PM condition can be expressed as $\Delta\beta = \beta(2\omega) - 2\beta(\omega) 0$.

It is mentioned that the SHG and PDC processes may be considered to be the reverse of each other. In the low conversion regime, in which the undepleted pump approximation holds, SH efficiency and the parametric gain assume similar expressions [3, 12]. Moreover, the bandwidth BW for SHG corresponds to the bandwidth BW for PDC, when they are read in terms of SH wavelength and pump wavelength respectively. However, the bandwidth BW for the PDC process for signal and idler wavelengths (for a fixed pump wavelength) is much broader, in particular at degeneracy [3, 12]. In the following, bandwidth is discussed in terms of SHG, although the findings can be extended to the pump bandwidth in a PDC process.

Returning to the specific example of the SON-PDC process, quasi phase matching includes an additional grating contribution term $m(2\pi c/\Lambda)$ which arises from the periodic modulation for the m-th order harmonic, assuming a square-wave modulation of the non-linear properties. The QPM condition is then:

$$\Delta\beta = \beta(\omega_p) - \beta(\omega_s) - \beta(\omega_i) - m(2\pi/\Lambda) = 0$$

It is also known that the efficiency $\eta$ of a parametric process in the low conversion efficiency regime is given by the expression:

$$\eta \propto L^2 sinc^2(\Delta\beta L/2)$$

where L is the interaction length. Thus, efficiency can be improved by increasing the interaction length L (where $\Delta\beta \sim 0$) or reducing $\Delta\beta$, i.e. by better satisfying the QPM condition. For example, it will be possible to determine for a given non-linear material the variation of efficiency of a non-linear process as a function of signal and/or pump frequency, efficiency being maximized for the set of wavelengths which satisfy the QPM condition.

The usable bandwidth for a non-linear process can be defined in terms of a threshold of $sinc^2$ ($\Delta\beta L/2$), such as:

$$sinc^2(\Delta\beta L/2) \geq \frac{1}{2}$$

which can be rewritten as:

$$\Delta\beta \leq 0.886\pi/L$$

from which it is apparent that, while a long interaction length L improves efficiency, it narrows the bandwidth. The only way of improving efficiency without sacrificing bandwidth is thus by improving the phase matching, i.e. by reducing $\Delta\beta$.

The design of a waveguide structure for parametric processes has to consider several parameters, including efficiency, bandwidth, and single mode operation. In the low conversion regime, and assuming a uniform non-linearity across the beam profile, the SHG efficiency (or parametric gain in PDC) is of the form $$\eta \propto \frac{L^2}{A_{ovl}} sinc^2\left(\frac{\Delta\beta L}{2}\right) \quad (1)$$

where $A_{ovl}$ is the effective area which takes account of the overlap of the interacting waves: $A_{ovl} = 1/I_{ovl}^2$ where the overlap intensity $I_{ovl} = |\int E_{SH}^* E_F^2 dA|$ with $E_{SH}$ and $E_F$ the normalised second harmonic (SH) and fundamental transverse profile respectively-defined so that $\int |E_{SH}|^2 dA = \int |E_F|^2 dA = 1$. The other parameters of the expression have already been defined. The effect of the factors $\Delta\beta$ and L on efficiency $\eta$ has already been discussed. From this equation it is however also apparent that efficiency $\eta$ can be increased by reduction of the effective overlap area $A_{ovl}$ in absolute units of area (and increase of the degree of overlap)

Having now described the basic design considerations for designing devices based on non-linear effects, the prior art is reviewed.

Efficient QPM-SHG and PDC have been demonstrated in periodically poled ferroelectrics waveguides [2a, 2b] and glass fibers [3, 12]. Through the use of considerable interaction lengths L, good efficiency has been achieved in SHG devices, at the cost of limited bandwidth BW and lack of single mode operation at all wavelengths.

These prior art periodically poled ferroelectrics waveguides and glass fibers thus cannot deliver the large bandwidth that is important to ensure stable operation of SHG devices (for example temperature stability when high power is involved) or for SHG devices operating in the pulsed regime where one requires that interaction occurs for all the spectral components of the pulse.

Moreover, in the case of PDC (or difference frequency generation) a broad pump wavelength bandwidth is crucial for certain applications, for example in the routing of a multi-channel WDM system when one wants to have the possibility to switch from any channel into any other channel using difference frequency generation. The fact that typically one has large signal and idler bandwidths and narrow pump bandwidths means that routing around the degenerate point is possible, but not from one channel close to this point to another far from it (this would imply the use of other pump wavelengths). Basically, the device would function as an efficient spectral inverter [4].

To enhance the product of bandwidth and interaction length, BW•L, it has been proposed to use aperiodic QPM structures [5]. The resulting efficiency is however small compared to that achievable for the same device length with a periodic QPM structure due to a reduction of the effective interaction length L.

As far as single mode operation in QPM-PDC (and difference frequency generation) devices is concerned, it has been proposed that complex waveguide structures [6] can be used to launch efficiently the pump at short wavelength into a waveguide which is single mode for the idler and the signal frequencies. For example, the signal and idler may be generated at around 1.5 $\mu$m from a 0.75 $\mu$m pump in a waveguide with a first cut-off wavelength at 1.3 $\mu$m. The pump needs to be launched into the mode that satisfies the QPM condition at both the fundamental signal mode frequency and the idler mode frequency. Usually, the mode at the pump frequency also has to be the fundamental mode for efficient operation, i.e. good coupling efficiency and mode overlap.

Another proposed solution to provide single mode operation is to use cascading of the SON. A pump (with frequency close to that of signal and idler) is frequency doubled and subsequently down converted in the same waveguide structure [4]. This method has the drawback that longer waveguides are needed to achieve similar efficiency with respect to the former situation where a pump at twice the frequency of the signal and idler is launched into the waveguide.

In summary, with the prior art QPM device designs, there is generally a trade-off between the important design parameters of efficiency, bandwidth and the requirement of single mode operation.

It is therefore an aim of the invention to relax these design constraints so that QPM devices can be made with an improved combination of efficiency and bandwidth together with single mode operation.

SUMMARY OF THE INVENTION

According to one aspect of the invention there is provided a device based on a parametric process involving first and second frequencies $\omega_1$ and $\omega_2$ that differ, the device comprising an optical fiber comprising a core and a cladding, the optical fiber being poled with a non-linearity profile having a period that satisfies a quasi phase matching (QPM) condition including the first and second frequencies, wherein the cladding of the optical fiber comprises a hole structure for providing waveguiding confinement of at least one optical mode in the core.

Through the use of a poled holey fiber of suitable hole structure, it is possible to increase the SH efficiency η as defined in Equation (1) in comparison with poled conventional (non-holey) fiber. One factor contributing to the high efficiency is the increase in the bandwidth-length product, which can be order of magnitude greater than for conventional fiber. Another factor contributing to the high efficiency is the ability of a holey fiber to provide a low fundamental mode area and a low SH mode area combined with good overlap between the fundamental mode and the SH mode. It is the combination of properties relating to mode area and SH bandwidth, each of which can be individually tailored in a holey fiber structure, that together allow a high efficiency η to be achieved.

Another important factor is the ability in holey fiber structures to control dispersion properties. As well as allowing control of the linear dispersion, the microstructuring with holes can provide a low value of the group velocity mismatch GVM=$(d\beta/d\omega)_{\omega 1}-(d\beta/d\omega)_{\omega 2}$ and higher order dispersion terms. A low value of GVM is important in determining phase matching properties of processes that involve significantly different wavelengths.

Specifically, in the case of SHG, the phase mismatch can be written as follows:

$$\Delta\beta=\beta(2\omega)-2\beta(\omega)=2[(d\beta/d\omega)_{2\omega o}-(d\beta/d\omega)_{\omega o}][\omega-\omega_0]+ [2(d^2\beta/d\omega^2)_{2\omega o}-(d^2\beta/d\omega^2)_{\omega o}][\omega-\omega_0]^2=\ldots \quad (2)$$

where $\omega_0$ is the PM or QPM fundamental frequency. From this expression it can be understood that large bandwidths are obtainable. This is achieved in some solutions by minimizing the first order term of the expansion so that GVM= $(d\beta/d\omega)_{2\omega o}-(d\beta/d\omega)_{\omega o}\rightarrow 0$, and similarly minimizing the higher order terms. In other solutions, the different order terms together cancel or offset each other.

Further details of GVM and its role in determining phase matching properties are discussed in the context of traditional optical fibers in reference [10]. With conventional optical fibers, it was shown that GVM tends to zero for fundamental wavelengths ~1.8 $\mu$m which is too long a wavelength to be of interest for general telecommunications applications around wavelengths of 1.3 or 1.55 $\mu$m. Using dispersion shifted and non-zero dispersion fibers it may be possible to shift the GVM zero point to shorter wavelengths, but only perhaps to 1.6–1.7 $\mu$m. By contrast, as discussed in the following, with the invention it is possible to shift the GVM zero point below 1.6 $\mu$m while simultaneously ensuring that higher order dispersion terms in Equation (2) cancel each other, at least partially.

Through the use of a poled holey fiber of suitable hole structure, it is also possible to overcome the difficulties in achieving single mode operation in the prior art straightforwardly, since the hole structure can be designed to be single-mode for the first and second frequencies $\omega_1$ and $\omega_2$ of the parametric process, even when the values are widely differing. In fact, it is possible to make the poled holey fiber single mode for all interacting wavelengths of the parametric process, so-called endlessly single-moded fiber [7].

Here it is noted that single mode operation at both the first frequency $\omega_1$ and the second frequency $\omega_2$ of the parametric process is highly desirable for simple parametric processes in which the pump interacts directly with the signal, e.g. $\lambda_s$=1505 $\mu$nm, $\lambda_i$=1495 nm and $\lambda_p$~750 nm (where $\lambda$ is wavelength) for a process $\omega_p-\omega_s\rightarrow\omega_i$. However, for cascaded processes, efficient operation can be provided without single mode operation at all relevant frequencies, e.g. $\lambda_s$=1505 nm, $\lambda_i$=1495 nm and $\lambda_p$~1500 nm for a cascaded process $\omega_p+\omega_p\rightarrow 2\omega_p$ followed by $2\omega_p-\omega_s\rightarrow\omega_i$. In this example, since the conversion process $\omega_p+\omega_p\rightarrow 2\omega_p$ takes place in the fiber, single mode operation is not needed at $2\omega_p$, but only at the closely interspaced frequencies $\omega_p$, $\omega_s$ and $\omega_i$.

A variety of other choices of the fundamental wavelength are possible. In particular, the fact that holey fiber can be made of a single material allows the full transmission window of the material concerned to be used for frequency conversion. For example, in a pure silica holey fiber visible light can be frequency doubled into the ultraviolet. One example of a suitable optical glass for making poled holey fiber is the silica glass Herasil (trade name).

Holey fibers are discussed in the prior art [7]. In particular, it is known in the prior art that holey fibers can be designed with small effective areas to provide high efficiency third-order nonlinear processes, e.g. four-wave mixing (FWM) [8]. In fact for nearly-degenerate operation the BW for a FWM process is inversely proportional, in first-order approximation, to the value of $d^2/d\omega^2$ which can be kept nearly zero over a wide range of wavelength using particular designs [9]. However, this work does not relate to broadband parametric processes involving disparate frequencies.

Further studies applying the theory of reference [9] have been carried out which indicate that the desired combination of single mode operation, broad bandwidth and good efficiency is achievable with a wide variety of hole structures. It is possible to calculate the relevant device parameters for any proposed hole structure using the theory of reference [9]. In that way, a suitable hole structure can be decided upon prior to fabrication.

According to another aspect of the invention there is provided a method of fabricating a device based on a parametric process involving first and second frequencies $\omega_1$ and $\omega_2$ that differ, the method comprising: providing an optical fiber having a hole structure; and poling the optical fiber to generate a non-linearity profile having a period that satisfies a quasi phase matching (QPM) condition including the first and second frequencies.

The poling is preferably carried out using a so-called optical poling method, as described in reference [11], the contents of which are incorporated herein by reference. Namely, the poling preferably comprises: thermal poling of the optical fiber to generate a non-linearity therealong; placing a mask adjacent to the optical fiber; and exposing the optical fiber with UV light through the mask to selectively erase the non-linearity along the waveguide structure thereby to generate the non-linearity profile having the period that satisfies the QPM condition. The mask may be an amplitude mask or a phase mask.

In an embodiment, the thermal poling comprises maintaining the optical fiber at an elevated temperature (typically a few hundred degrees Celsius) while applying an electric field across the hole structure. The first and second electrodes are arranged to straddle the hole structure.

As described further below, it is possible to fabricate electrodes integral to the optical fiber close to the optically active part of the fiber.

A particular advantage of the optical poling method, as opposed to more conventional thermal poling, is that no electrode structuring is required. Continuous electrodes can be used. This is important, since continuous electrodes can be conveniently arranged embedded in the holey fiber structure. The electrodes may be inserted after drawing the holey fiber, or may be formed integrally with the holey fiber during the fiber drawing process. In this way, it is possible to place the electrodes close together straddling the optically active area of the waveguide where the mode is confined so that large electric fields can be generated in this region to provide good poling.

By contrast, it would be less attractive to form patterned or structured electrodes onto the holey fiber, as would be required for thermal poling. Nevertheless, alternative embodiments of the invention may use thermal poling. For example, the thermal poling may involve deposition of a patterned electrode on the outer surface of the fiber, as described in reference [12]. Alternatively, the outer surface of the fiber may be structured as described in reference [13], the contents of which are incorporated herein by reference.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
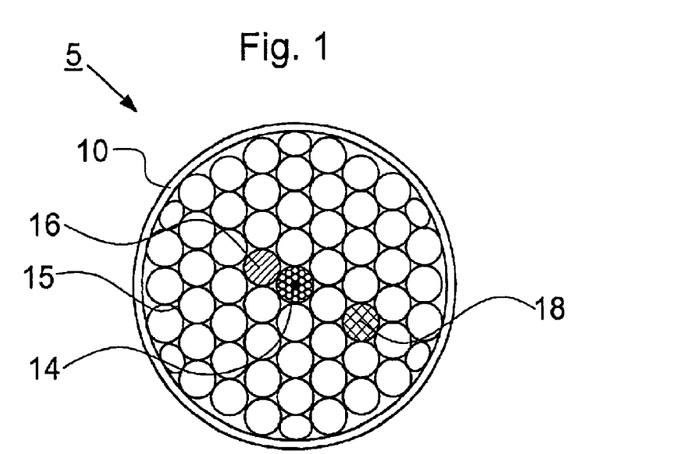
FIG. 1 is a schematic section through an optical fiber according to a preferred embodiment of the invention.

FIG. 1 is a sectional view of a holey fiber structure according to an embodiment of the invention. A microstructured inner cane 14 containing the optically active waveguiding part of the structure is supported by an array of larger-scale capillaries 15. The inner cane 14 comprises a solid core and a holey cladding, which are illustrated in more detail in FIG. 2, discussed further below. The support capillaries 15 are retained in a relatively thin outer jacket 10. In an alternative embodiment, the outer jacket could be dispensed with and the support capillaries fused together at the top and bottom prior to pulling. As can be seen from the figure, the support capillaries 15 have an outside diameter approximately the same as the outside diameter of the inner cane 14, so that the inner cane can be arranged with the support capillaries 15 in a hexagonal close packed array. More generally, it is convenient for the support capillaries to be of the same order of magnitude of lateral dimension as the inner cane. Preferably the support capillaries have lateral dimensions of between one fifth and five times that of the inner cane, more especially between one half and twice that of the inner cane.

The capillaries can be made in a variety of ways. Typically, the starting point for the capillaries is a large-scale tube. The large-scale tubes can be produced by: extrusion, milling and drilling, polishing, piercing, spin/rotational casting, other casting methods (e.g. built-in casting), compression molding, direct bonding etc. The tubes are then caned down using a fiber draw tower to the dimensions required for the preform assembly.

With this design, the thermal mass of the supporting structure used to bulk out the central region of the holey fiber is significantly reduced in comparison to a thick-wall outer jacket. It is thus easier to pull the fiber from the preform and to retain the desired form of microstructure within the vicinity of the central, optically active, holey region 14.

As well as supporting the inner cane 14, the capillaries 15 are used to host anode and cathode electrodes 16 and 18 arranged either side of the inner cane 14. The anode electrode 16 is advantageously disposed closer to the inner cane 14 than the cathode electrode 18. The electrodes are used for thermally poling the inner cane 14, more especially the region of the core, as described further below. The electrodes can be created by inserting metal wires (e.g. gold or tungsten) into the holes at the preform stage. The electrodes could also be drawn from graphite, graphite alloy or graphite doped capillaries 15, instead of using metal wires. Other conductive materials or dopants may also be used. Alternatively, the electrodes may be inserted into the support capillaries after fiber drawing.

Figure 1A:
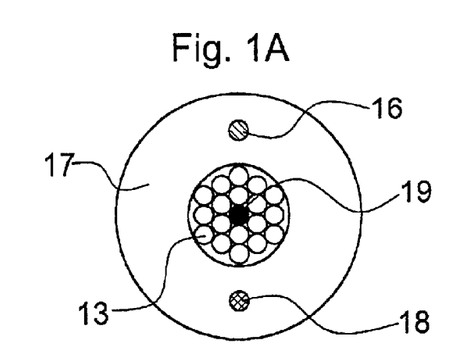
FIG. 1A is a schematic section through an optical fiber according to an alternative embodiment.

FIG. 1A shows an alternative to supporting the optically active parts of the holey fiber in a network of support capillaries 15, as illustrated in FIG. 1. In FIG. 1A the holey fiber comprises a solid (or hollow) core rod 19 surrounded by at least one ring of hollow cladding capillaries 13 (two rings in the figure) which in turn is enclosed in a relatively thick-walled outer jacket 17, rather than the support capillaries of FIG. 1. In this case, one option for making the poling electrodes is, as illustrated, to provide a pair of holes 16 and 18 axially running through the outer jacket arranged either side of the optically active holey fiber core and cladding region. The electrode holes 16 and 18 for forming the anode and cathode electrodes respectively could be drilled at the preform stage through the outer jacket material. This type of electrode arrangement is described in more detail in the context of a conventional fiber in reference [11], more specifically in connection with FIG. 13 thereof.

Figure 1B:
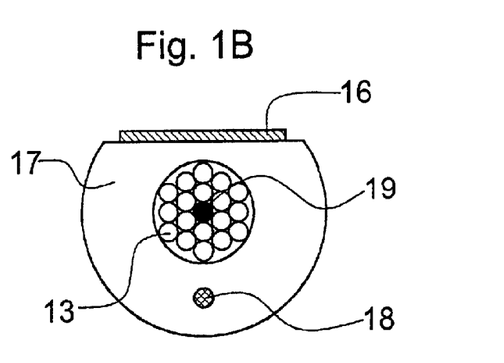
FIG. 1B is a schematic section through an optical fiber according to a further alternative embodiment.

FIG. 1B shows another option for making the poling electrodes in the case that a relatively thick-walled outer jacket is present. As in the example of FIG. 1A, the holey fiber comprises a solid (or hollow) core rod 19 surrounded by at least one ring of hollow cladding capillaries 13 (two rings in the figure) which in turn is enclosed in a relatively thick-walled outer jacket 17. However, in this example, only one hole 18 is provided axially through the thick-walled outer jacket 17, this hole being for the cathode electrode. Then, after drawing the fiber, one face of the fiber is chamfered flat to produce a D-shaped fiber, as illustrated. This approach is known from poling conventional fiber [13, 12]. The flat surface is thus brought relatively close to the inner edge of the outer jacket 17, i.e. relatively close to the radially outer ones of the capillaries 13 that form the holey cladding. The chamfering may be performed by milling followed by etching, for example. A second electrode 16 for use as the anode is then be deposited or otherwise formed on the flat surface of the D-shaped fiber. This type of arrangement is described in more detail in the context of a conventional fiber in reference [11], more specifically in connection with FIGS. 7A and 7B thereof. In a D-shaped fiber, the embedded electrode in the thick-walled outer jacket may be dispensed with, as will be understood from reference [11], specifically FIG. 3 thereof. In this case the cathode is formed by a conductive substrate brought into contact with the curved underside of the D-shaped fiber.

Figure 2:
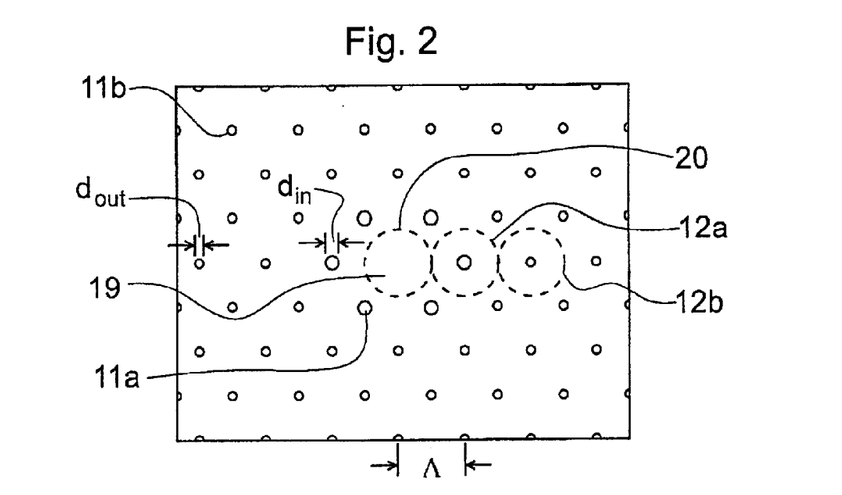
FIG. 2 is a schematic section showing the central part of the optical fiber of FIG. 1 in more detail.

Returning to the main embodiment of FIG. 1, a central region of the structure shown in FIG. 1 is illustrated in more detail in FIG. 2. The central region comprises a solid core 19, formed from a solid rod in the preform, as indicated schematically with dashed lines 20. In other embodiments, the core may be microstructured, i.e. holey rather than solid. The solid core 19 is surrounded by a plurality of inner holes 11a, formed from capillaries in the preform, as indicated schematically with dashed lines 12a. Arranged radially outside the inner holes 11a, there is a plurality of outer holes 11b, formed from capillaries in the preform, as indicated schematically with dashed lines 12b. The inner holes 11a have a characteristic diameter $d_{in}$ that is greater than the characteristic diameter $d_{out}$ of the outer holes 11b. Alternatively, $d_{out}$, may be less than or the same as $d_{out}$. In the illustrated example, the capillaries from which the outer and inner holes are formed are of similar diameter, resulting in the inner and outer holes being spaced apart by a single characteristic pitch $\Delta$. Although it is convenient to fabricate hole structures that are periodic and these have thus been concentrated upon, non-periodic hole structures are also expected to provide suitable optical properties for embodying the invention.

FIG. 2 shows several rings of outer holes 11b. In general, there will be at least one inner ring and one outer ring of holes for most holey fiber applications. The number of rings may be greater, e.g. three, four, five, six or more, but it should be borne in mind that very large numbers of capillaries will present fabrication difficulties. A single ring of holes may also be used.

The influence of the hole geometry on bandwidth for a given interaction length L have been studied in detail using the theoretical model of reference [9]. From these studies it is clear that the dispersive properties of the periodically poled holey fiber can be substantially modified via the arrangement of air holes that form the cladding region of the fiber. The holey fiber geometry allows significantly more freedom for producing optimum dispersion values at both second harmonic and pump wavelengths than conventional fibers, which allows for a much broader bandwidth for SHG. The calculations show that the dispersion depends on the size and arrangement of the holes in the cladding as well as the dimensions of the structure relative to the wavelengths of the pump, signal and idler waves.

The calculations have concentrated on hole geometries such as illustrated in FIG. 2 comprising a solid core, a single inner ring of holes of diameter $d_{in}$ and multiple outer rings of holes of diameter $d_{out}$ both sets of cladding holes conforming to a common pitch or inter-hole spacing $\Delta$. The bandwidth BW for SHG has been calculated when the holey fiber is pumped at 1.55 $\mu$m to produce 0.775 $\mu$m light and is quantified as the full width half maximum (FWHM) of the SH power as a function of fundamental wavelength. The parameter $A_{ovl}$ is the overlap area between the fundamental and the second harmonic waves. The parameter $FWHM^2/A_{ovl}$ in the right hand column is the SH FWHM (column 5) squared divided by the overlap area (column 7) and represents a figure of merit for the structure in that it combines the effects of the overlap area and the dispersion which both contribute to the device efficiency as will be understood from the above mathematical description of the SH process. The parameter $FWHM^2/Ao_{ovl}$ is used as a figure of merit, because the efficiency scales as $FWHM^2/A_{ovl}$ for a fixed bandwidth, where FWHM is calculated for a fixed interaction length. The fixed length for all the following examples is L=10 cm. A selection of the calculated results labeled A, B, C etc. are shown below in Table 1.

TABLE 1

Examples of the Invention

| Label | $\Lambda$ [μm] | $d_{in}/\Lambda$ | $d_{out}/\Lambda$ | SH FWHM [nm] | QPM period α [μm] | $A_{ovl}$ [μm²] | $FWHM^2/A_{ovl}$ |
|---|---|---|---|---|---|---|---|
| A | 1.0 | 0.2 | 0.1 | 25 | 41 | 23 | 27 × 10⁻⁶ |
| B | 2.0 | 0.4 | 0.4 | 89 | 30 | 11 | 720 × 10⁻⁶ |
| C | 3.0 | 0.4 | 0.4 | 45 | 41 | 17 | 119 × 10⁻⁶ |
| D | 3.5 | 0.4 | 0.4 | 53 | 46 | 22 | 128 × 10⁻⁶ |
| E | 3.75 | 0.4 | 0.4 | 56 | 49 | 25 | 25 × 10⁻⁶ |

The figure of merit values $FWHM/A_{ovl}$ in the examples of the invention are thus of the order of $10^{-5}$ to $10^{-3}$. By way of comparison, the highest value of the figure of merit $FWHM^2/A_{ovl}$ achievable with conventional (non-holey) fiber is around $0.4 \times 10^{-6}$, as tabulated below in Table 2.

TABLE 2

Conventional Fiber Examples

| Label | NA | a [μm] | SH FWHM [nm] | $A_{ovl}$ [μm²] | $FWHM^2/A_{ovl}$ |
|---|---|---|---|---|---|
| I | 0.065 | 7 | 1.8 | 220 | 0.015 × 10⁻⁶ |
| II | 0.19 | 3 | 2.0 | 35 | 0.114 × 10⁻⁶ |
| III | 0.32 | 1.8 | 2.2 | 13 | 0.37 × 10⁻⁶ |

In Table 2, NA is the numerical aperture of the optical fiber, 'a' is the core diameter and the other parameters are as specified for Table 1.

Comparing the results for prior art devices and those embodying the invention, the holey fiber structures have second-harmonic bandwidths (SHG BW) in the range of about 10 to 100 nm (for L=10 cm), whereas the conventional (non-holey) optical fibers, have SHG BW values of ≈2 nm (also for L=10 cm). The bandwidth improvement offered by the holey fiber devices is thus between about 5 to 50 times. It is probable that further calculations may reveal other air hole arrangements that demonstrate even better available bandwidths for SHG and other optical parametric processes.

In addition to the remarkable bandwidth properties, it is noted that the holey fibers with relatively small air holes can be endlessly single-moded, i.e. they remain single-mode regardless of the wavelength, more specifically at both 1.55 and 0.775 microns. In the table, example fibers A and B are both endlessly single-moded. In such a fiber, light in both the pump and SH could be guided in a single-mode in the fiber, which offers substantial advantages for devices, as described earlier. The fact that these fibers can be endlessly single-mode allows for improved overlap between pump and SH light (and hence reduced $A_{ov}$), which also serves to significantly improve the efficiency of SHG in these fibers. The mode area of a holey fiber typically does not vary as much with wavelength as in conventional fibers, which allows significant improvements in the modal overlap between SH and fundamental waves to be achieved, as is apparent from a comparison of the two tables. In addition, the absolute size of the mode area in a holey fiber can be made very small which also improves the SH efficiency in comparison to conventional fiber. The overall effect is an increase of over three orders of magnitude in the efficiency factor $FWHM^2/A_{ovl}$.

To fabricate the holey fiber, a preform is placed in a fiber drawing tower. Fiber drawing is performed by the controlled heating and/or cooling of the silica or other glass through a viscosity range of around $10^6$ poise. It is useful to monitor the diameter and tension of the fiber as it is being drawn and use the data thus acquired in an automatic feedback loop to control the preform feed speed, the fiber draw speed and/or other parameters related to the furnace in order to yield a uniform fiber diameter.

A principal component of the drawing tower used to pull the preform into fiber form is a heat source, which may be a graphite resistance heater or a radio-frequency (RF) furnace.

It is critical to control the fiber drawing temperature, and hence the glass viscosity, so that two criteria are met. First, the fiber drawing temperature must soften the glass to provide a viscosity for which the glass can deform and stretch into a fiber without crystallization. Second, the softening of the glass must not be so great that the crucial internal structure, i.e. the holes, collapse and flow together. Cooling is provided above and below the furnace's hot zone. The cooling keeps the glass outside the hot zone cooled to below its crystallization temperature.

Although the above examples use tubes as a basis for the holey fiber preform, it will be understood that other shapes could be used either in the holey support structure or for the holey cladding part of the structure. It is sufficient that the holey outer support structure and holey cladding have a sufficient number of gaps or cavities to provide the desired properties. It will also be understood that the hole arrangement in the support structure will generally have no bearing on the optical properties of the fiber, since the fiber waveguide modes will usually have no significant power outside the holey cladding. Periodic or aperiodic arrangements may be used. It will also be understood that the holes in the cladding need not be periodic, unless the fiber is intended to have photonic band gap effects.

After drawing the holey fiber structure, the next main fabrication stage is the poling. The poling comprises a first step of uniform thermal poling the core region, followed by a second step of selective UV erasure of parts of the uniformly thermally poled core region to provide the desired non-linearity profile along the optical axis of the fiber. This combination of uniform thermal poling and selective UV erasure is referred to as periodic optical poling (POP), following usage in the art, although the non-linear modulation does not have to be periodic. POP contrasts with so-called periodic thermal polling (PTP) in which the non-linear modulation is imposed by a single step of non-uniform thermal poling, typically using some kind of structured electrode.

The holey fiber is uniformly thermally poled in a vacuum. Thermal poling is performed by applying 3–5 kV voltage across the electrodes at 270–280° C. for 10–20 minutes. The vacuum atmosphere reduces the probability of breakdown, which may otherwise occur in air when these voltages are used over a small electrode gap. In fact, the embedded nature of the electrodes, reduces the probability of electrical breakdown during the thermal poling, so that a high vacuum may not be required. Indeed, poling in air may be possible. The embedded electrode structure reduces the breakdown probability because any conductive path between the two electrodes has to be mainly through the bulk of the material. As well as improving reliability of the thermal poling, this allows higher voltages to be applied without encountering breakdown problems.

The fact that the holey fiber is typically a single material fiber is expected to be of further benefit. (In a holey fiber, waveguiding confinement can be produced with no materials difference between core and cladding). This is because practical problems that occur when poling a fiber doped with some dopants, such as Ge, should not occur. There are thus expected to be practical advantages in using holey fibers for parametric devices in addition to the advantages of the beneficial optical properties.

Figure 3:
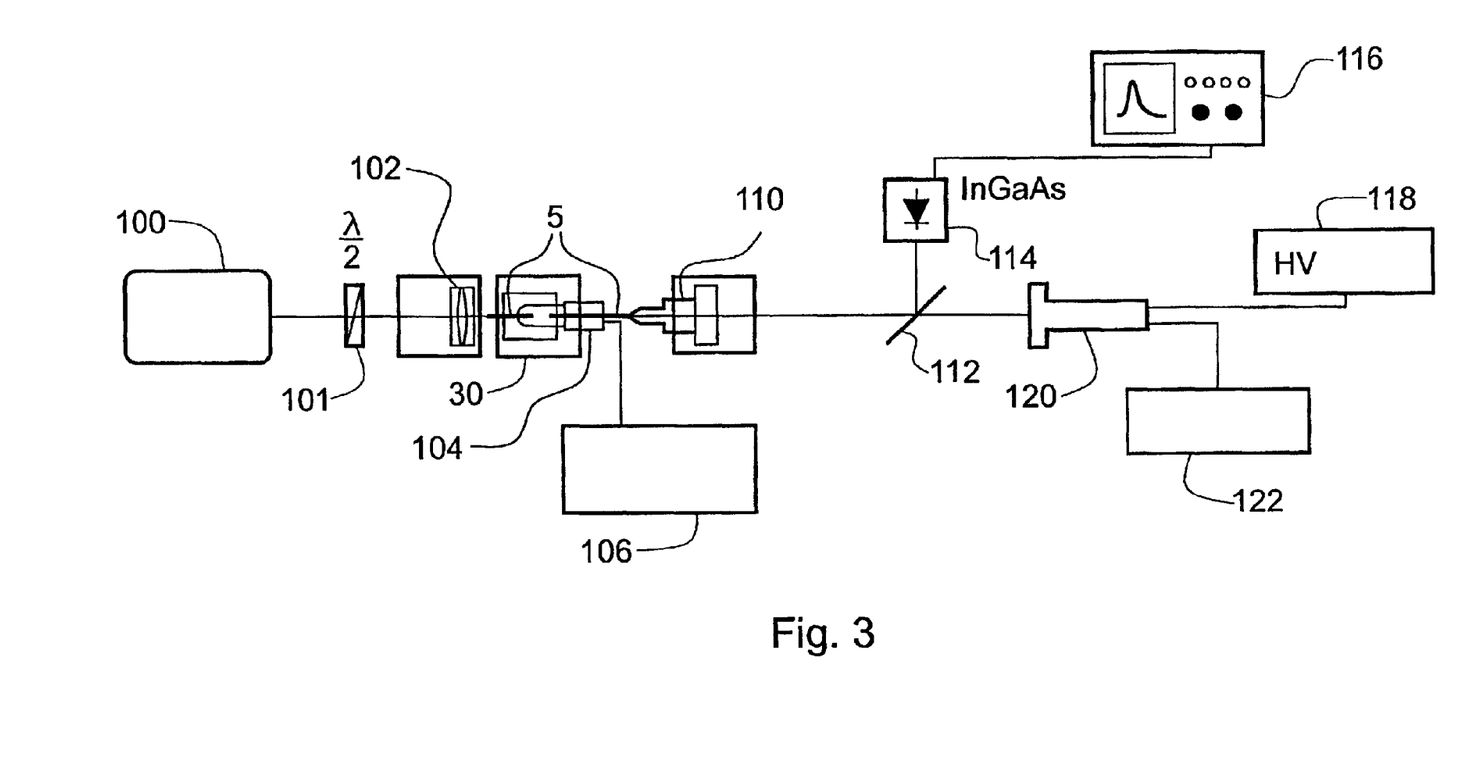
FIG. 3 shows an apparatus used for performing periodic UV erasure of a uniformly thermally poled optical fiber.

FIG. 3 shows the experimental set-up used for carrying out the next process step of UV exposure to selectively erase the uniformly thermally poled core region of the fiber 5. The apparatus comprises a sample holder 30 for holding the fiber 5 for UV exposure from a UV lamp 104 powered by a power supply 106. The UV lamp 104 may be a mercury lamp or a deuterium lamp, emitting at around or below 200 nm. The coupling optics used with this lamp were made of $MgF_2$ ensuring that operation down to 120 nm is provided. Best results are achieved with the deuterium lamp, since the UV erasure process in the optical glass appears to be much more sensitive to UV radiation below 200 nm, specifically in the range 120–200 nm, more especially 170–200 nm. This enhanced sensitivity effect is observed with silica glass as well as the germanosilicate glass. The sensitivity means that very low powers are sufficient for the UV erasure. As a consequence, large areas can be processed without the need for high power sources, such as high-power UV lasers.

As an alternative to UV lamps, a UV laser or other well-collimated UV sources could be used to provide a better defined non-linear modulation by creating a straight-through (more rectangular-like) light pattern.

The UV erasure is monitored in situ by measuring the growth of the QPM second harmonic (SH) signal in the holey fiber in real time. To perform this monitoring, a tunable pulsed laser source 100 is provided and arranged to illuminate the holey fiber sample through a half-wave plate 101 and focusing lens 102. In the specific example, a quasi-cw Er-doped fiber light source tunable in the range of 1525–1555 nm was used. The initial signal is not phase-matched and is produced in several SH waveguided modes, whereas the growth in the SH signal is associated to the QPM signal in the fundamental mode.

The SH signal growth is observed to take place over a period of a few minutes to an hour depending on the sensitivity of the UV erasure process. The SH signal growth follows a capacitive-type rise curve and the UV erasure is stopped once the signal growth has reached or neared saturation.

The SH signal is collected, by a ×20 microscope objective 110 in the example, and directed to a photomultiplier tube (PMT) 120 biased by a high voltage power supply 118. Standard lock-in detection of the signal is used to improve signal-to-noise ratio, as indicated by the lock-in detector 122. The laser source 100 is electrically gated or optically chopped (not shown) as part of the lock-in detection. A beam splitter 112 is arranged prior to the PMT and directs a portion of the collected SH signal onto an InGaAs photo-diode 114 connected to a digital oscillos$\omega_p$ e 116 to detect pulse shape from the pulsed laser source 100.

An amplitude mask is suitable for use in combination with a non-coherent source, such as the UV lamp of the present embodiment. The UV light pattern could however also be formed using a phase mask placed sufficiently close to the fiber. However in that case a coherent light source would be required. If a phase mask was used, this could also provide apodization, for example in the form of amplitude modulated parts at the peripheral regions of the mask, in which case the mask could be described as a phase and amplitude mask.

Figure 4:
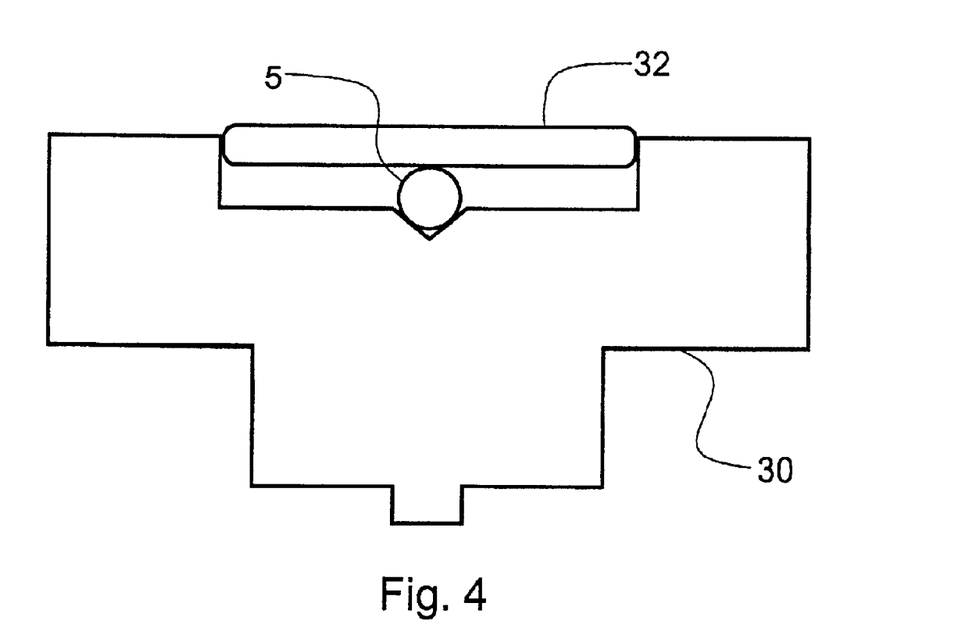
FIG. 4 shows in schematic section an optical fiber arranged for periodic UV erasure in the apparatus of FIG. 3.

FIG. 4 shows schematically in cross-section the sample holder part of the apparatus of FIG. 3. The uniformly thermally poled holey fiber 5 is arranged in a V-groove of a mask holder 30. An amplitude mask 32 is then held above the fiber 5 in position for illumination by the UV lamp light, thereby to generate the desired non-linearity profile in the fiber, e.g. a second order non-linearity profile.

Figure 5:
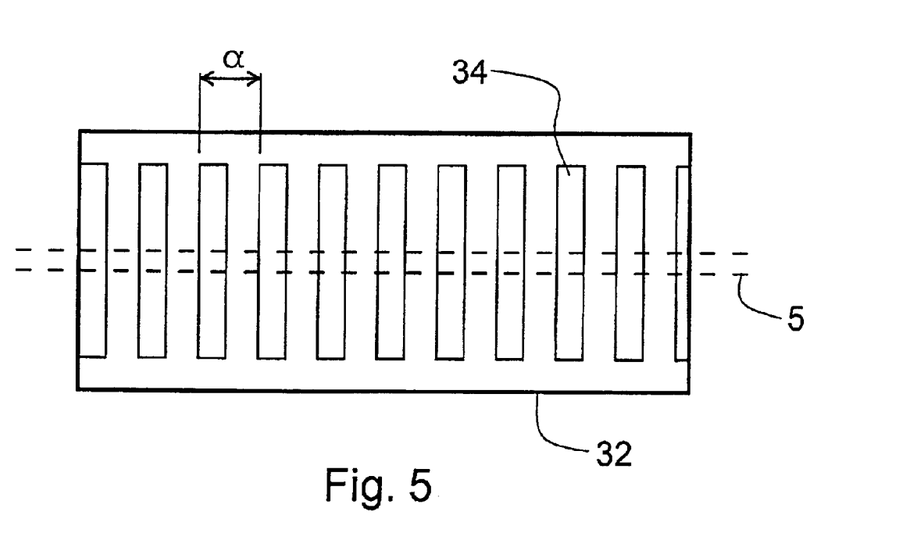
FIG. 5 is a plan view of FIG. 4.

FIG. 5 shows the situation of FIG. 4 in plan view, highlighting the structure of the amplitude mask 32 which comprises opaque strips 34 (e.g. formed by metal deposition) arranged periodically with a period $\alpha$ (e.g. $\alpha$=10 to 100 microns) along the optical axis of the underlying optical fiber 5.

Figure 6:
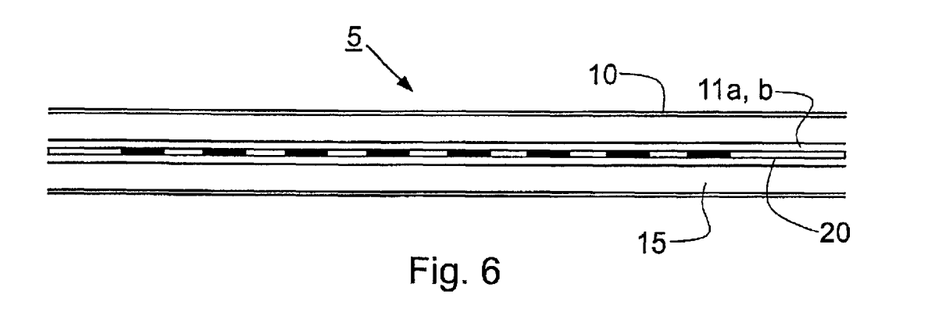
FIG. 6 is a schematic longitudinal axial section through a forward-interaction second harmonic generator (SHG) device.

FIG. 6 is a schematic longitudinal axial section through the completed holey optical fiber structure 5 for use in a forward-interaction second harmonic generator (SHG) device. The periodically poled second-order non-linearity in the core 20 is shown schematically by black and white striping in the figure. The outer parts of the inner cane containing the holes 11a and 11b surround the core 20 and, in turn are surrounded by the supporting capillaries 15 and outer jacket 10.

Figure 7:
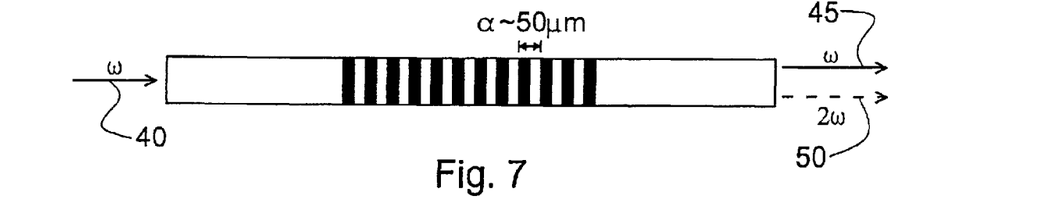
FIG. 7 is a schematic of the device of FIG. 6 showing the second order non-linearity modulation and the light signals.

FIG. 7 is a schematic of a SHG device incorporating the holey fiber shown in FIG. 6. The figure shows the second order non-linearity modulation, again with stripes, together with the light signals, namely an input pump 40 of frequency $\omega$, a frequency-doubled signal output 50 of frequency $2\omega$ which emerges from the output side of the device together with a residual pump signal 45 of frequency $\omega$. For this kind of forward-interaction device, the poling period will typically be from 10 to about 100 microns, with a period of 30–60 microns being typical.

FIGS. 8 to 12 show further device examples that can incorporate the above-described POP holey fibers.

Figure 8:
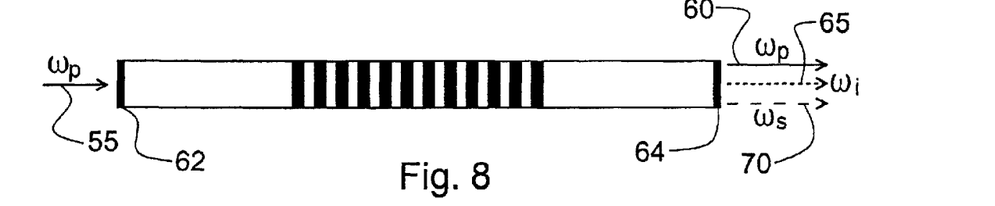
FIG. 8 is a schematic drawing of an optical parametric oscillator (OPO) device embodying the invention.

FIG. 8 shows an optical parametric oscillator (OPO) which is an example of a forward three-wave-mixing (TWM) based device. Suitable optical feedback must be provided by means of mirrors 62 and 64 that can be external or directly fabricated onto the polished ends of the non-linear poled holey fiber. OPOs find frequent use as sources of coherent radiation possessing a very broad tunability range, which find useful application for example in spectroscopy, material and laser science.

Figure 9:
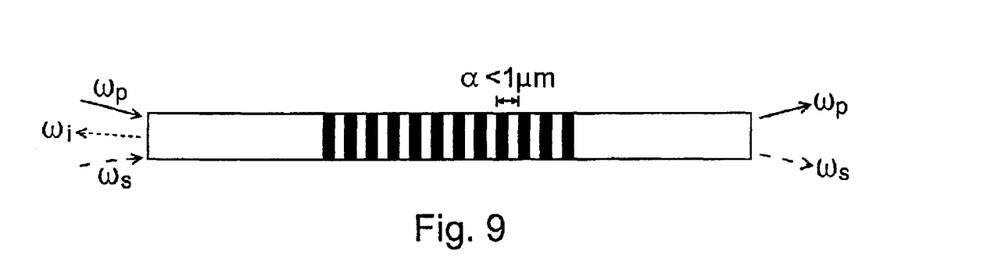
FIG. 9 is a schematic drawing of a backward-interaction three-wave mixing (TWM) device embodying the invention.

FIG. 9 shows a backward TWM fiber device that provides a transparent and effective frequency converter, which would be largely employed in Wavelength-Division-Multiplexing (WDM) optical telecommunication systems. The pump beam interacting with the non-linear holey fiber and with the incoming signal, produces a backward travelling idler which carries the same modulation as the signal at a different wavelength such that: $\omega_i + \omega_s = \omega_p$ where $\omega_i$, $\omega_s$, $\omega_p$ are used to denote idler, signal and pump frequency respectively. The phase-matching condition is provided by the use of a periodic non-linearity achieved in the core by means of the above-described POP method, it being noted that the period $\alpha$ required for the poling is much smaller than for forward-interaction devices, typically of the order of a micron or less, so that use of a phase mask, rather than an amplitude mask, may be preferred for the POP. The small poling period is needed in order to compensate for the large momentum mismatch between the counter-propagating waves.

An advantage of backward interaction is the separation between the signal and the idler and pump, which occurs naturally. A wavelength converter based on such device would not therefore require any further optical filtering to separate the desired wavelength (idler) from the residual ones (pump and signal).

Another application of backward-interaction TWM is for the implementation of mirror-less optical parametric oscillators, where the optical feedback required in order to start the oscillation is provided by the backward propagation of the waves inside the non-linear fiber.

Figure 10:
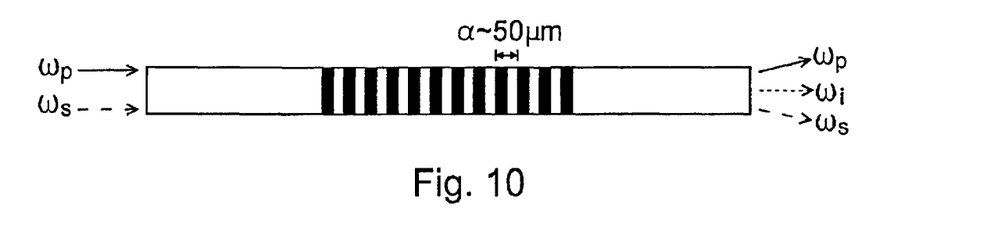
FIG. 10 is a schematic drawing of a forward-interaction TWM device embodying the invention.

FIG. 10 shows a forward-interaction TWM fiber device, comparable to the one described above based on backward-interaction. The illustrated forward-interaction TWM device provides a transparent and effective frequency converter, which would be largely employed in Wavelength-Division-Multiplexing (WDM) optical telecommunication systems.

The pump beam interacts with the non-linear fiber and with the incoming signal to produce a forward travelling idler which carries the same modulation as the signal at a different wavelength such that: $\omega_i+\omega_s=\omega_p$, where $\omega_i$, $\omega_s$, $\omega_p$ denote idler, signal and pump frequency respectively. At the same time, the signal wave is also amplified. The phase-matching condition is provided by the use of a periodic non-linearity achieved in the core by means of the above-described POP method. An advantage of a forward-interaction TWM device is that the poling period can be large, e.g. tens of microns which is convenient for fabrication. However, due to the co-propagating nature of the waves involved, optical filtering is necessary to separate idler from signal and to suppress the residual pump signal.

Figure 11:
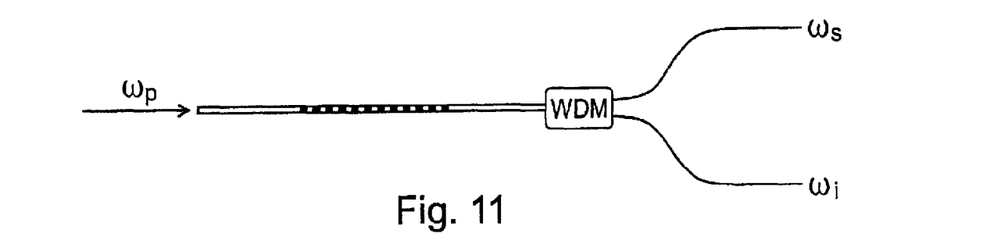
FIG. 11 is a schematic drawing of a forward-interaction photon pair generator device embodying the invention.

FIG. 11 shows a photon-pair generator device based around a holey fiber possessing periodic second-order non-linearity and is a particular case of TWM. Here a forward configuration is considered. The pump enters the holey fiber device and interaction with the non-linear medium provides amplification for the photons originated by quantum noise. Each pump photon of frequency $\omega_p$ is then split into two photons of frequency $\omega_i$ and $\omega_s$. The two photons represent a pair and possess special correlation properties, which exhibit non-local behavior. This can be exploited for example in fiber-based quantum key distribution systems where the photon pair generator would represent the light source.

Figure 12:
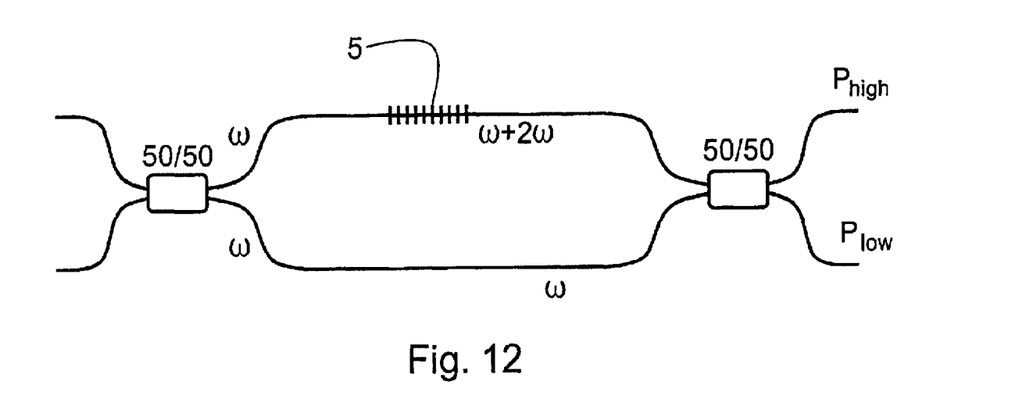
FIG. 12 is a schematic drawing of a power dependent switch device embodying the invention.

FIG. 12 shows another device which is a power dependent optical switch. In this device the non-linearity is cascaded, by which it is meant the pump at frequency $\omega$ is frequency doubled and then converted back to co. In this process, the pump wave acquires a phase shift, which is power dependent and that can be used in combination with an interferometer, e.g. Mach-Zehnder as shown with the poled fiber 5 arranged in one arm thereof, in order to implement a power dependent switch. If the power is high the signal will exit port $P_{high}$, otherwise $P_{low}$. Part of the pump signal will be unavoidably lost to second harmonic. An optical fiber possessing periodic second order non-linearity would allow the implementation of a fully fiberized version of such a device, thus improving its integratability with existing fiber optics networks.

References

1. J. A. Armstrong et al., 'Interactions between light waves in a nonlinear dielectric', Phys. Rev. 127, 1918–1939 (1962).
2a. M. Yamada et al., ° 'First-order quasi-phase-matched $LiNbO_3$ waveguide periodically poled by applying an external field for efficient blue second-harmonic generation', Appl. Phys. Lett. 62, 435 (1993).
2b. P. Baldi et al., 'Efficient quasi-phase-matched generation of parametric fluorescence in room temperature LiNbO3 waveguides', Elec. Lett. 29, 1539 (1993).
3. V. Pruneri et al., 'Greater than 20% efficient frequency doubling of 1532 nm nanosecond pulses in quasi-phase-matched germano-silicate optical fibers', Opt. Lett. 24, 208 (1999).
4. M. H. Chou et al., 'Efficient wide-band and tunable midspan spectral inverter using cascaded nonlinearities in LiNbO3 waveguides', IEEE Phot. Tech. Lett. 12, 82 (2000).
5. M. Nazarathy et al., 'Spread-spectrum nonlinear-optical interactions: quasi-phase-matching with pseudorandom polarity reversals', Opt. Lett. 12, 823 (1987).
6. M. H. Chou et al., '1.5-$\mu m$-band wavelength conversion based on difference-frequency generation in LiNbO3 waveguides with integrated coupling structures', Opt. Lett. 23, 1004 (1998).
7. T. A. Birks, J. C. Knight and P. St. J. Russell, 'Endlessly single-mode photonic crystalfiber', Opt. Lett. 22, 961 (1997).
8. J. K. Ranka, R. S. Windeler and A. J. Stentz, 'Optical properties of high-delta air-silica microstructure opticalfibers', Opt. Lett. 25, 796 (2000).
9. Tanya M. Monro, D. J. Richardson, N. G. R. Broderick and P. J. Bennett, 'Holey fibers: an efficient modal model', J. Lightwave Technol. 17, 1093 (1999).
10. V. Pruneri et al., 'Efficient frequency doubling of 1.5 $\mu m$ femtosecond laser pulses in quasi-phase-matched opticalfibers', Appl. Phys. Lett. 72, 1007 (1998).
11. PCT/GB00/02839
12. G Bonfrate et al, 'Parametric fluorescence in periodically poled silica fibers' Appl. Phys. Lett. 75, 2356 (1999).
13. PCT/GB00/02829

What is claimed is:

1. A device based on a parametric process Involving first and second frequencies $\omega_1$ and $\omega_2$ that differ, the device comprising:
   an optical fiber comprising a core and a cladding, the optical fiber being poled with a non-linearity profile having a period that satisfies a quasi phase matching (QPM) condition including the first and second frequencies,
   wherein the cladding of the optical fiber comprises a hole structure for providing waveguiding confinement of at least one optical mode in the core.

2. A device according to claim 1, wherein the hole structure is dimensioned and arranged to provide a bandwidth BW of at least 5, 10, 20 or 50 nonometers per ten centimeter length of the holey fiber.

3. A device to claim 1, wherein the holed structure is dimensioned and arranged to provide single mode operation at both the first frequency $\omega_1$ and the second frequency $\omega_2$.

4. A device according to claim 1, wherein the hole structure is dimensioned and arranged to provide an effective area of the fundamental mode of less than 0, 25, 20 or 15 $\mu m^2$.

5. A device to claim 1, wherein the first frequency $\omega_1$ is greater than the second frequency $\omega_2$ by at least one of 10%, 20%, 30%, 40%, 50%, 60%, 70%, 80% and 90%.

6. A device according to claim 1, wherein the first frequency w, is greater than the second frequency $\omega_2$ in terms of wavelength by at least one of 0.1, 0.2, 0.3, 0.4, 0.5, 0.6, 0.7, 0.8, 0.9 and 1.0 microns.

7. A device according to claim 1, wherein the parametric process is parametric down conversion (PDC).

8. A device according to claim 1, wherein the first frequency is twice the second frequency $\omega_1=2\omega_2=\omega_0$.

9. A device according to claim 8, wherein the parametric process is second harmonic generation (SHG).

10. A device according to claim 1, wherein the first frequency is approximately equal to, but different from, the second frequency $\omega_1 \sim \omega_2 \sim \omega_0$.

11. A device according to claim 1, wherein the hole structure comprises a plurality of inner holes arranged radially within a plurality of outer holes, the inner holes having a characteristic hole size that is different from that of the outer holes.

12. A device according to claim 11, wherein the inner holes are arranged in the optical fiber around a solid core.

13. A device according to claim 1, wherein the hole structure is arranged within an inner cane, and wherein the inner cane is supported by a plurality of outer canes arranged around the inner cane.

14. A device according to claim 13, further comprising first and second electrode arranged in respective first and second ones of the outer canes so as to straddle the inner cane.

15. A method of fabricating a device based on parametric process involving first and second frequencies $\omega_1$ and $\omega_2$ that differ, the method of comprising:

providing an optical fiber having a hole structure;

poling the optical fiber to generate a non-linearity profile having a period that satisfies a quasi phase matching (QPM) condition including the first and second frequencies.

16. A method according to claim 15, wherein the poling comprises:

thermal poling of the optical fiber to generate a non-linearity therealong;

placing a mask adjacent to the optical fiber; and exposing the optical fiber with UV light through the mask to selectively erase the non-linearity along the waveguide structure thereby to generate the non-linearity profile having the period that satisfies the QPM condition.

17. A method according to claim 16, wherein the mask is an amplitude mask, a phase mask or a phase and amplitude mask.

18. A method according to claim 16, wherein the thermal poling comprise maintaining the optical fiber at an elevated temperature while applying an electric field across the hole structure using first and second electrodes arranged to straddle the hole structure.

19. A method according to claim 18, wherein the electrodes are integral with the optical fiber.

* * * * *

UNITED STATES PATENT AND TRADEMARK OFFICE
CERTIFICATE OF CORRECTION

PATENT NO. : 6,801,356 B2
APPLICATION NO. : 09/986363
DATED : October 5, 2004
INVENTOR(S) : Neil Broderick et al.

It is certified that error appears in the above-identified patent and that said Letters Patent is hereby corrected as shown below:

*In claim 1, column 14, line 25, "Involving" should read --involving--.

In claim 2, column 14, line 38, "nonometers" should read --nanometers--.

In claim 3, column 14, line 40, "device to claim 1, wherein the holed" should read -- device according to claim 1, wherein the hole--.

*In claim 4, column 14, line 45, "than 0," should read --than 30,--.

In claim 5, column 14, line 47, "device to" should read --device according to--.

*In claim 6, column 14, line 51, "w," should read --$\omega_1$--.

In claim 8, column 14, line 57, "$\omega_1=2\omega_2=\omega_0$." should read --$\omega_1 = 2\omega_2 \equiv \omega_0$.--.

*In claim 14, column 15, line 8, "electrode" should read --electrodes--.

In claim 15, column 15, line 11, "on parametric" should read --on a parametric--.

*In claim 18, column 16, line 13, "comprise" should read --comprises--.

Signed and Sealed this

Twenty-second Day of August, 2006

JON W. DUDAS
*Director of the United States Patent and Trademark Office*